United States Patent
Kataoka et al.

(10) Patent No.: US 9,530,630 B2
(45) Date of Patent: Dec. 27, 2016

(54) THERMIONIC POWER GENERATOR

(71) Applicants: DENSO CORPORATION, Kariya, Aichi-pref. (JP); National Institute of Advanced Industrial Science and Technology, Chiyoda-ku, Tokyo (JP)

(72) Inventors: Mitsuhiro Kataoka, Kasugai (JP); Yuji Kimura, Nagoya (JP); Susumu Sobue, Obu (JP); Daisuke Takeuchi, Tsukuba (JP); Hiromitsu Kato, Tsukuba (JP); Satoshi Yamasaki, Tsukuba (JP)

(73) Assignees: DENSO CORPORATION, Kariya (JP); National Institute of Advanced Industrial Science and Technology, Tokyo (JP)

(*) Notice: Subject to any disclaimer, the term of this patent is extended or adjusted under 35 U.S.C. 154(b) by 147 days.

(21) Appl. No.: 14/480,667

(22) Filed: Sep. 9, 2014

(65) Prior Publication Data
US 2015/0075579 A1    Mar. 19, 2015

(30) Foreign Application Priority Data
Sep. 13, 2013  (JP) ................................ 2013-190103

(51) Int. Cl.
  *H02N 10/00*   (2006.01)
  *H01J 1/02*    (2006.01)
  *H01J 61/06*   (2006.01)
  *B32B 15/04*   (2006.01)
  *H01J 45/00*   (2006.01)

(52) U.S. Cl.
CPC ..................................... *H01J 45/00* (2013.01)

(58) Field of Classification Search
CPC ................................ H01L 35/30; H01J 21/00
USPC .................. 310/306; 313/355, 491; 428/627
See application file for complete search history.

(56) References Cited

U.S. PATENT DOCUMENTS

| | | |
|---|---|---|
| 2011/0050080 A1 | 3/2011 | Suzuki et al. |
| 2011/0139205 A1 | 6/2011 | Kimura et al. |
| 2011/0221328 A1* | 9/2011 | Nemanich ................ H01J 1/14 313/355 |

* cited by examiner

*Primary Examiner* — Jose Gonzalez Quinones
(74) *Attorney, Agent, or Firm* — Posz Law Group, PLC

(57) ABSTRACT

A thermionic power generator includes an emitter generating thermions and a collector collecting the thermions. The emitter includes an emitter substrate having an electric conductivity, a low resistance layer stacked to the emitter substrate and made of an n-type diamond semiconductor that includes phosphorus as a donor, and an electron emission layer stacked to the low resistance layer and made of an n-type diamond semiconductor that includes nitrogen as a donor. The collector includes a collector substrate having an electric conductivity and is disposed opposite to the emitter via a clearance. The electron emission layer has a thickness equal to or less than 40 nm.

5 Claims, 3 Drawing Sheets

THERMIONIC POWER GENERATOR

CROSS REFERENCE TO RELATED APPLICATIONS

The present application is based on and claims priority to Japanese Patent Application No. 2013-190103 filed on Sep. 13, 2013, the contents of which are incorporated in their entirety herein by reference.

TECHNICAL FIELD

The present disclosure relates to a thermionic power generator that converts thermal energy to electrical energy.

BACKGROUND

As a power generator that converts thermal energy into electrical energy, a thermionic power generator that generates electromotive force using thermion emission is known. For example, JP-A-2009-238690 (corresponding to US 2011/0050080 A1) discloses an electron emission element in which a first diamond layer and a second diamond layer are formed on a conductive substrate. In the electron emission element, phosphorus is used as a dopant doped to the first diamond layer, and nitrogen is used as a dopant doped to the second diamond layer so as to increase thermionic current.

However, the thermionic current of the electron emission element is not enough to be used for a thermionic power generator, and a power generation efficiency is low.

SUMMARY

It is an object of the present disclosure to provide a thermionic power generator having a high power generation efficiency.

A thermionic power generator according to an aspect of the present disclosure includes an emitter generating thermions and a collector collecting the thermions. The emitter includes an emitter substrate having an electric conductivity, a low resistance layer stacked to the emitter substrate and made of an n-type diamond semiconductor that includes phosphorus as a donor, and an electron emission layer stacked to the low resistance layer and made of an n-type diamond semiconductor that includes nitrogen as a donor. The collector includes a collector substrate having an electric conductivity and is disposed opposite to the emitter via a clearance. The electron emission layer has a thickness equal to or less than 40 nm.

The thermionic power generator can increase thermionic current and can have a high power generation efficiency.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

Figure 1:
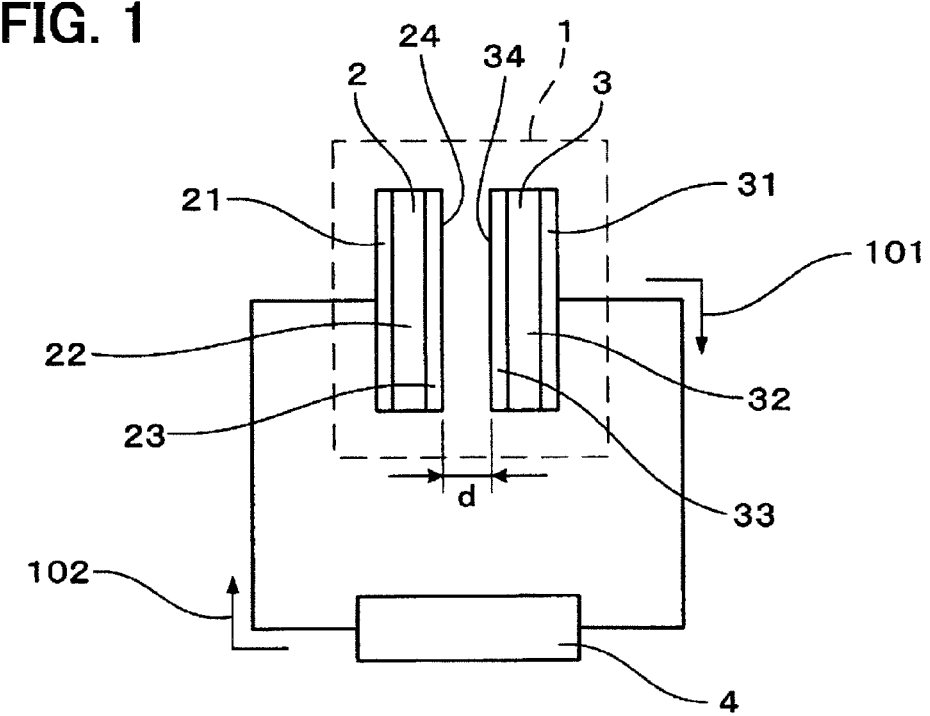
FIG. 1 is a diagram illustrating a thermionic power generator according to an example 1.

A thermionic power generator according to an embodiment of the present disclosure includes an emitter generating thermions and a collector collecting the thermions. The emitter includes an emitter substrate having an electric conductivity, a low resistance layer stacked to the emitter substrate and made of an n-type diamond semiconductor that includes phosphorus as a donor, and an electron emission layer stacked to the low resistance layer and made of an n-type diamond semiconductor that includes nitrogen as a donor. The collector includes a collector substrate having an electric conductivity and is disposed opposite to the emitter via a clearance. The electron emission layer has a thickness equal to or less than 40 nm.

The emitter in the thermionic power generator includes the low resistance layer made of the n-type diamond semiconductor that includes phosphorus as the donor and the electron emission layer stacked to the low resistance layer and made of the n-type diamond semiconductor that includes nitrogen as the donor. The electron emission layer has the thickness equal to or less than 40 nm. With the above-described configuration, the thermionic power generator can remarkably increase thermionic current.

Although this mechanism is not fully clarified at this time, it can be considered that an influence of the electron emission layer having a relatively large resistance can be reduced by reducing the thickness of the electron emission layer. The following examples show that thermionic current increases when the electron emission layer has a thickness equal to or less than 40 nm.

The thermionic power generator can easily increase thermionic current and can have a high power generation efficiency.

In the thermionic power generator, the n-type diamond semiconductor forming the low resistance layer in the emitter may have a dopant concentration of phosphorous equal to or greater than $1\times10^{19}$ cm$^{-3}$. In this case, a resistance in a thickness direction of the low resistance layer can be reduced enough and thermionic current can be easily increased. The resistance decreases with increase in dopant concentration of phosphorous. However, when the dopant concentration is greater than $1\times10^{21}$ cm$^{-3}$, it is difficult to obtain effects corresponding to a doped amount.

The n-type diamond semiconductor forming the electron emission layer may have a dopant concentration of nitrogen equal to or greater than $1\times10^{20}$ cm$^{-3}$. In this case, a resistance in a thickness direction of the electron emission layer can be reduced enough and thermionic current can be easily increased. The resistance decreases with increase in dopant concentration of nitrogen. However, when the dopant concentration is greater than $1\times10^{21}$ cm$^{-3}$, it is difficult to obtain effects corresponding to a doped amount.

The thickness of the electron emission layer is equal to or less than 40 nm as described above. When the thickness of the electron emission layer is greater than. 40 nm, it is difficult to increase thermionic current. On the other hand, when the thickness of the electron emission layer is excessively small, it is difficult to form the electron emission layer uniformly, and the low resistance layer may be exposed on a surface of the emitter. In this case, effects of stacking the electron emission layer cannot be obtained, and the power generation efficiency may be reduced. Thus, the thickness of the electron emission layer may be within a range from 1 nm to 40 nm.

The emitter surface of the emitter opposite to the collector may be terminated with hydrogen. In this case, in an energy band of the emitter, a vacuum level becomes lower than a lower end of a conduction band, that is, the emitter has a so-called negative electron affinity (NEA). Thus, electrons thermally excited in the emitter are easily emitted from the emitter surface. As a result, thermionic current can be increased more easily, and the power generation can be further improved.

The emitter may have an internal resistance equal to or less than 1 $\Omega cm^2$ in a thickness direction between the emitter substrate and the emitter surface, and the collector may have an internal resistance equal to or less than 1 $\Omega cm^2$ in a thickness direction between the collector substrate and a collector surface opposite to the emitter. In this case, a voltage drop when electric current originating in thermions pass through the emitter and the collector can be reduced, and a loss due to the voltage drop can be sufficiently reduced. As a result, the power generation efficiency of the thermionic power generator can be improved.

The emitter substrate may include one of silicon (Si), titanium (Ti), molybdenum (Mo), iridium (Ir), tantalum (Ta), tungsten (W), ruthenium (Ru), chromium (Cr), or platinum (Pt). The emitter substrate including the above-described substance can easily generate a core of diamond when the low-resistance layer is formed. In addition, in a temperature region of growing the diamond semiconductor, a generated diamond layer is less likely to be peeled off from the emitter substrate. Thus, in this case, the low resistance layer having few defects and made of diamond semiconductor having a high film quality can be formed. As a result, the internal resistance in the thickness direction between the emitter substrate and the emitter surface can be further reduced, and the power generation efficiency can be further improved.

In the above-described substances, it is more preferable to use Si as the emitter substrate because high-quality Si with few impurities and few defects can be easily available. Thus, a manufacturing cost of the thermionic power generator can be further reduced.

The emitter may include an interface intermediate layer between the emitter substrate and the low resistance layer. The interface intermediate layer is preferably configured so that a sum of a resistance in a thickness direction of the interface intermediate layer, an interface resistance with the emitter substrate, and an interface resistance with the low resistance layer is smaller than an interface resistance between the emitter substrate and the low resistance layer. In this case, the resistance in the thickness direction between the emitter substrate and the emitter surface can be further reduced. As a result, the power generation efficiency of the thermionic power generator can be further improved.

The interface intermediate layer may include metal carbide. As the metal carbide, for example, titanium carbide, tantalum carbide, tungsten carbide, molybdenum carbide, silicon carbide, or chromium carbide may be used. In the above-described substances, it is more preferable to use titanium carbide.

Example 1

A thermionic power generator 1 according to an example 1 of the above-described embodiment will be described with reference to FIG. 1 through FIG. 4. As illustrated in FIG. 1, the thermionic power generator 1 includes an emitter 2 generating thermions and a collector 3 disposed opposite to the emitter 2 via a clearance d and collecting the thermions. The emitter 2 includes an emitter substrate 21, a low resistance layer 22, and an electron emission layer 23. The emitter substrate 21 has an electric conductivity. The low resistance layer 22 is stacked to the emitter substrate 21 and is made of an n-type diamond semiconductor including phosphorus as a donor. The electron emission layer 23 is stacked to the low resistance layer 22 and is made of an n-type diamond semiconductor including nitrogen as a donor.

The collector 3 includes at least a collector substrate 31 having an electric conductivity. The electron emission layer has a thickness equal to or less than 40 nm.

In the emitter 2 according to the present example, the low resistance layer 22 and the electron emission layer 23 are stacked in order on the emitter substrate 21 made of molybdenum. The emitter substrate 21 can serve as an electrode connected with an external load 4.

The low resistance layer 22 is made of an n-type diamond semiconductor formed by a microwave plasma CVD using $CH_4$ gas as carbon source and using $PH_3$ gas as phosphorus source. The low resistance layer 22 is formed under the following conditions. In addition, a thickness of the low resistance layer 22 is set to 2.5 μm, and a dopant concentration of phosphorus is set to $1 \times 10^2$ $cm^{-3}$.

Substrate temperature: 1000° C.
Ratio of $CH_4$ gas flow rate to $H_2$ gas flow rate ($CH_4$ flow rate/$H_2$ flow rate): 0.01
Ratio of $PH_3$ gas flow rate to $CH_4$ gas flow rate ($PH_3$ flow rate/$CH_4$ flow rate): 0.05
Pressure during forming layer: 30 Torr
Microwave output: 750 W The electron emission layer 23 is made of an n-type diamond semiconductor formed by a microwave plasma CVD using $CH_4$ gas as carbon source and using $N_2$ gas as nitrogen source. The electron emission layer 23 is formed after formation of the low resistance layer 22 is completed. The electron emission layer 23 is formed under the following conditions. In addition, a thickness of the electron emission layer 23 is set to 20 nm, and a dopant concentration of nitrogen is set to $3 \times 10^2$ $cm^{-3}$.

Substrate temperature: 1000° C.
Ratio of $CH_4$ gas flow rate to $H_2$ gas flow rate ($CH_4$ flow rate/$H_2$ flow rate): 0.01
Ratio of $N_2$ gas flow rate to $CH_4$ gas flow rate ($N_2$ flow rate/$CH_4$ flow rate): 10
Pressure at forming layer: 50 Torr
Microwave output: 1000 W After the low resistance layer 22 and the electron emission layer 23 are formed on the emitter substrate 21, an emitter surface 24 (i.e., a surface of the electron emission layer 23) is treated with a hydrogen plasma processing so that the emitter surface 24 is hydrogenated. Following the hydrogen plasma processing, the emitter 2 is disposed in hydrogen atmosphere.

The emitter 2 formed by the above-described procedure has an internal resistance per unit area of about 0.7 $\Omega cm^2$ in a thickness direction between the emitter substrate 21 and the emitter surface 24. The internal resistance in the thickness direction between the emitter substrate 21 and the emitter surface 24 is measured by a two-terminal method. When the internal resistance is measured, a metal electrode was formed on the emitter surface 24 by deposition, and the metal electrode and the emitter substrate 21 are used as terminals in the two-terminal method.

The collector 3 according to the present example has a structure similar to the emitter 2. The collector 3 includes a collector substrate 31, a low resistance layer 32, and an electron emission layer 33. The collector substrate 31 was made of molybdenum. The low resistance layer 32 has a thickness of 2.5 μm and is stacked to the collector substrate 31. The electron emission layer 33 has a thickness of 20 nm and is stacked to the low resistance layer 32. The low resistance layer 32 and the electron emission layer 33 are formed similarly to the low resistance layer 22 and the electron emission layer 23 in the emitter 2. The collector has an internal resistance per unit area of about 0.7 $\Omega cm^2$ in a thickness direction between the collector substrate 31 and the collector surface 34.

A dimension of the clearance d between the emitter 2 and the collector 3 is not limited in particular. In the present example, the emitter 2 and the collector 3 are disposed so that the clearance d is within a range from 20 μm to 30 μm. In addition, a space between the emitter 2 and the collector 3 is decompressed to be equal to or less than $1 \times 10^{-5}$ Pa.

When the thermionic power generator 1 is operated, as illustrated in FIG. 1, the emitter 2 is heated in a state where the emitter substrate 21 and the collector substrate 31 are connected via the external load 4. Accordingly, thermions are emitted from the emitter surface 24 to the clearance d between the emitter 2 and the collector 3 and are collected by the collector 3. The thermions collected by the collector 4 flow to an external circuit from the collector substrate 31 (see an arrow 101), and return to the emitter 2 via the external load 4 (see an arrow 102).

Figure 2:
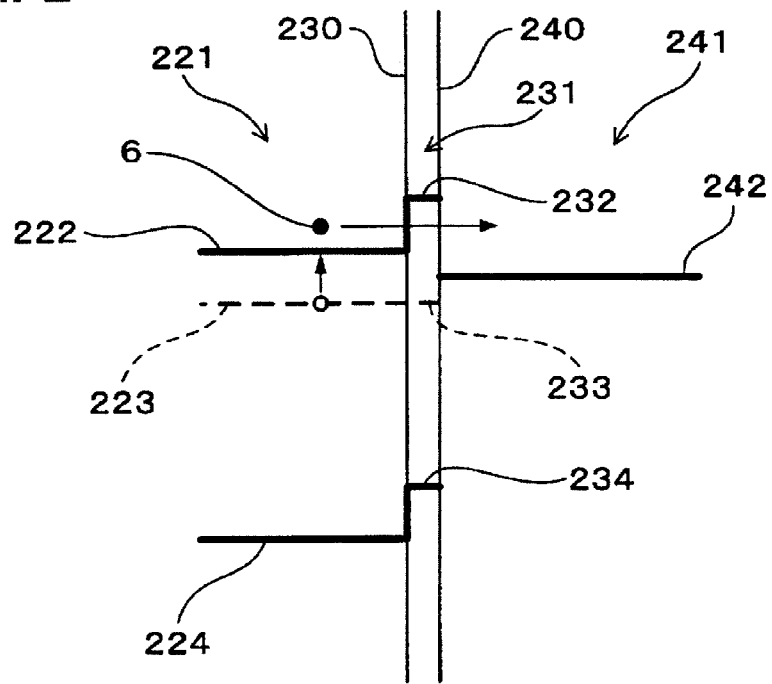
FIG. 2 is a diagram illustrating an energy band of an emitter according to the example 1.

Next, effects of the present example will be described with reference to FIG. 2 through FIG. 4. FIG. 2 is a diagram illustrating an example of an energy band of the emitter 2. A vertical position in FIG. 2 indicates an energy level, and an upper level indicates a higher energy level. A horizontal direction is divided into three regions 221, 231, 241 by two vertical lines 230, 240. The vertical line 240 corresponds to the emitter surface 24. The vertical line 230 corresponds to a boundary between the low resistance layer 22 and the electron emission layer 23. In the left region 221, a lower end 222 of a conduction band, an impurity level 223, and an upper end 224 of a valance band of the low resistance layer 22 are illustrated. In the center region 231, a lower end 232 of a conduction band of the electron emission layer 23, an impurity level 233, and an upper end 234 of a valance band of the electron emission layer 23 are illustrated. In the right region 241, a vacuum level 242 is illustrated.

Figure 3:
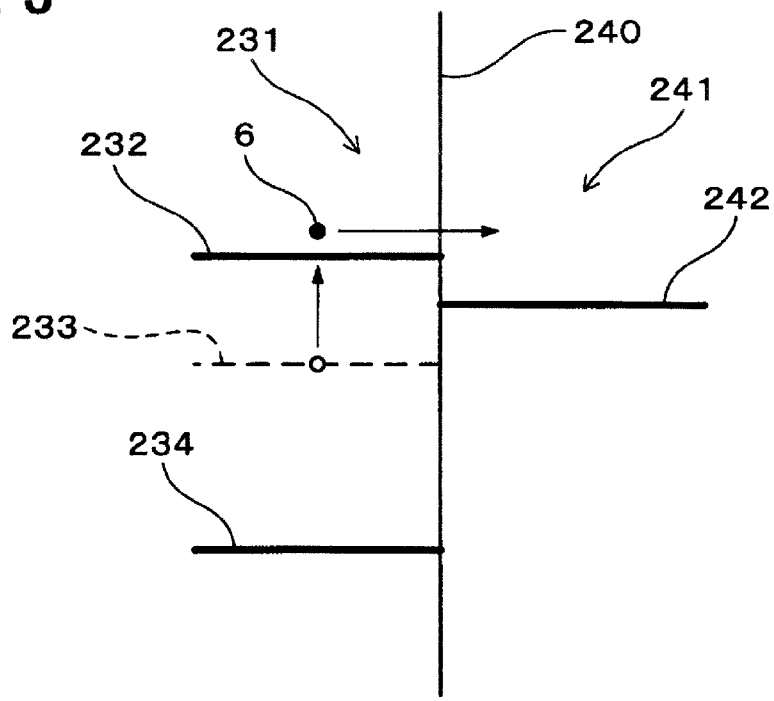
FIG. 3 is a diagram illustrating an example of an energy band in a case where only an electron emission layer is stacked to an emitter substrate.

FIG. 3 is a diagram illustrating an example of an energy band in a case where only the electron emission layer 23 is stacked to the emitter substrate 21. A vertical position in FIG. 3 indicates an energy level, similarly to FIG. 2. The vacuum level 242 is illustrated on a right side of the vertical line 240 corresponding to a surface, and an energy band of the electron emission layer 23 is illustrated on a left side of the vertical line 240.

Figure 4:
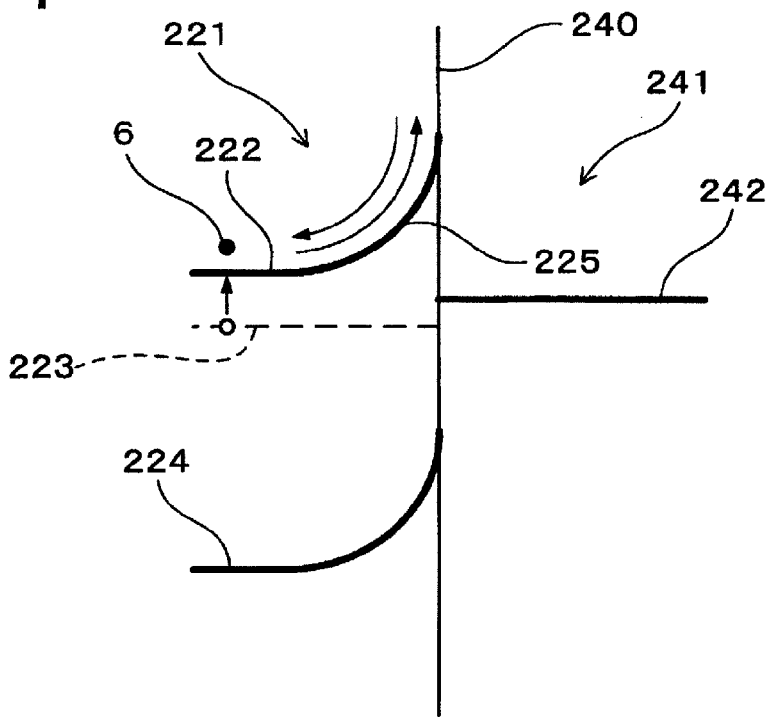
FIG. 4 is a diagram illustrating an example of an energy band in a case where only a low resistance layer is stacked to an emitter substrate.

FIG. 4 is a diagram illustrating an example of an energy band in a case where only the low resistance layer 22 is stacked to the emitter substrate 21. A vertical position in FIG. 4 indicates an energy level, similarly to FIG. 2. The vacuum level 242 is illustrated on a right side of the vertical line 240 corresponding to a surface, and an energy band of the low resistance layer 23 is illustrated on a left side of the vertical line 240. In reference numerals used in FIG. 3 and FIG. 4, reference numerals identical with reference numerals in FIG. 2 denote components similar to components in FIG. 2 unless otherwise stated.

As is known from FIG. 2 through FIG. 4, the impurity level 223 of the diamond semiconductor forming the low resistance layer 22 is closer to lower ends 222, 232 of the conduction bands than the impurity level 233 of the diamond semiconductor forming the electron emission layer 23. Phosphorus atom concentration in the low resistance layer is $1 \times 10^{20}$ $cm^{-3}$, thus, a hopping conduction occurs more easily in the low resistance layer 22 than the electron emission layer 23, and a resistance decreases. Thus, the emitter 2 according to the present example (see FIG. 2) can reduce the internal resistance in the thickness direction between the emitter substrate 21 and the emitter surface 24 compared with the case where the low resistance layer 22 is not provided as illustrated in FIG. 3.

In addition, as is known from FIG. 4, in a case where the diamond semiconductor forming the low resistance layer 22 is exposed as the emitter surface 24, an upward curve 225 is generated in the lower end 222 of the conduction band in the vicinity of the emitter surface 24, and thermionic current is less likely to be increased. This is because the hydrogen-terminated diamond semiconductor including phosphorus as the donor has a characteristic that an intrinsic unoccupied surface extended state is likely to be formed below the Fermi-level of the low resistance layer when exposed as the emitter surface 24. On the other hand, as illustrated in FIG. 2 and FIG. 3, when the hydrogen-terminated diamond semiconductor including nitrogen as the donor is exposed on the emitter surface 24, the intrinsic unoccupied surface extended state is likely to be formed above the Fermi-level of the emission layer when exposed as the emitter surface 24, and a curve of the conduction band is less likely to be generated in the vicinity of the emitter surface 24. Thus, the emitter 2 according to the present example can reduce a barrier in the vicinity of the emitter surface 24 and can increase thermionic current more easily compared with the case where the electron emission layer 23 is not stacked to the low resistance layer 22.

In the emitter 2 according to the present example, the thickness of the electron emission layer 23 is equal to or less than 40 nm. Accordingly, the thermionic power generator 1 can remarkably increase thermionic current.

In addition, in the emitter 2 according to the present example, the emitter surface 24 opposite to the collector 3 is terminated with hydrogen. Thus, electrons 6 thermally excited in the emitter 2 can be easily emitted from the emitter surface 24. As a result, the thermionic power generator 1 can further increase thermionic current and can further improve the power generation efficiency.

In addition, the emitter 2 has the internal resistance equal to or less than 1 $\Omega cm^2$ in the thickness direction between the emitter substrate 21 and the emitter surface 24, and the collector 3 has the internal resistance equal to or less than 1 $\Omega cm^2$ in the thickness direction between the collector substrate 31 and the collector surface 34 opposite to the emitter 2. As a result, the thermionic power generator 1 can further improve the power generation efficiency.

Example 2

In an example 2, the thickness of the electron emission layer 23 described in the example 1 is changed to various values. In the present example, emitters 2 (sample 1 through sample 4) in which thicknesses of electron emission layers 23 are respectively set to 20 nm, 40 nm, 60 nm, and 1000 nm are formed using conditions similar to the example 1. The other configurations are similar to the example 1.

Thermion emission performances of the sample 1 through the sample 4 are evaluated by the following method.

Firstly, one of the samples is attached to a cathode electrode disposed in a vacuum chamber, and the cathode electrode is brought into electric contact with the emitter substrate 21. Next, evacuation of the vacuum chamber is performed until the pressure inside the vacuum chamber becomes equal to or less than $1\times10^{-5}$ Pa. After the evacuation of the vacuum chamber is completed, the sample is heated to 600° C., a voltage is applied between the cathode electrode and the anode electrode disposed opposite to the cathode electrode via the clearance, and an electric field with field strength of 0.025 V/μm is formed. Then, thermionic current generated from the sample is measured.

It can be considered that a magnitude of thermionic current obtained by the above-described method is almost proportional to a magnitude of thermionic current when the thermionic power generator 1 is formed using each of the samples as the emitter 2.

Figure 5:
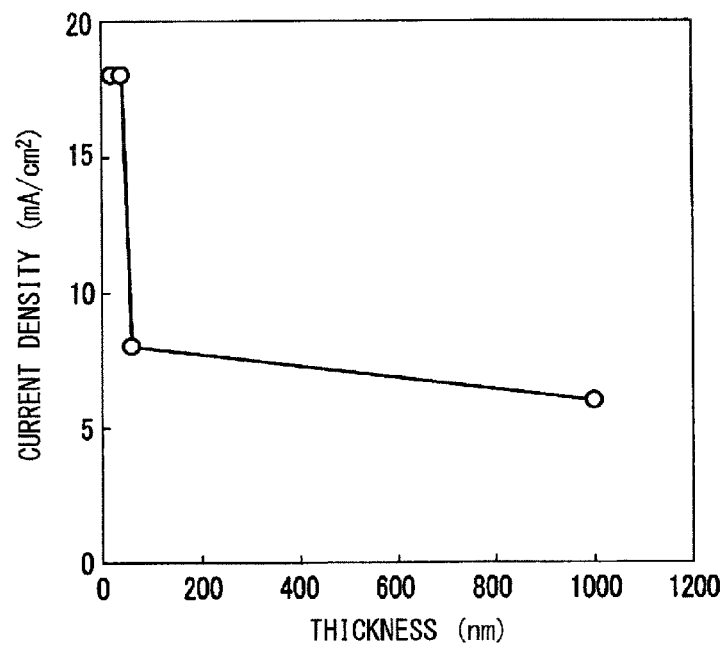
FIG. 5 is a graph showing a relationship between a thickness of an electron emission layer and a current density of thermionic current in an example 2.

Table 1 and FIG. 5 show results of converting the magnitude of thermionic current generated from each of the samples to a current density per unit area of the emitter surface 24. In FIG. 5, a vertical axis indicates the current density of thermionic current, and a horizontal axis indicates the thickness of the electron emission layer 23. Table 1 also shows an evaluation result of a sample 5 in which the electron emission layer 23 is stacked to the emitter substrate 21 and an evaluation result of a sample 6 in which the low resistance layer 22 is stacked to the emitter substrate 21 for comparison with the samples 1 through the sample 4. The electron emission layer 23 in the sample 5 has a thickness of 2.0 μm and has a nitrogen dopant concentration of $3\times10^{20}$ cm$^{-3}$. The low resistance layer 22 in the sample 6 has a thickness of 2.5 μm and has a phosphorus dopant concentration of $1\times10^{20}$ cm$^{-3}$.

TABLE 1

| | Thickness of Low Resistance Layer (μm) | Thickness of Electron Emission Layer (nm) | Current Density (mA/cm²) |
|---|---|---|---|
| Sample 1 | 2.5 | 20 | 18 |
| Sample 2 | 2.5 | 40 | 18 |
| Sample 3 | 2.5 | 60 | 8 |
| Sample 4 | 2.5 | 1000 | 6 |
| Sample 5 | — | 2000 | 6 |
| Sample 6 | 2.5 | — | 1 |

As shown in Table 1 and FIG. 5, the samples 1, 2 in which the thicknesses of the electron emission layers 23 are equal to or less than 40 nm show remarkably large current density of thermionic current compared with the samples 3, 4 in which the thickness of the electron emission layer 23 are greater than 40 nm, the sample 5 without the low resistance layer 22, and the sample 6 without the electron emission layer 23.

In addition, as shown in Table 1, the sample 3 and the sample 5 show substantially the same density. From the above-described results, in cases where the thickness of the electron emission layer 23 is equal to or greater than 60 nm, the internal resistance of the electron emission layer 23 affects the thermion emission performance, and the effects by stacking the low resistance layer 22 and the electron emission layer 23 cannot be obtained. Thus, the thickness of the electron emission layer 23 needs to be equal to or less than 40 nm in order to increase thermionic current by stacking the low resistance layer 22 and the electron emission layer 23 to the emitter substrate 21.

In the example 1 and the example 2, the internal resistance in the thickness direction between the emitter substrate 21 and the emitter surface is about 0.7 Ωcm². However, it can be assumed that effects similar to the example 1 and the example 2 can be obtained if the internal resistance is equal to or less than 1 Ωcm² because of the following reasons.

The power generation property of the thermionic power generator 1 can be expressed by the following equations (1), (2) as described in G. W. Sutton, Chokusetsu Enerugi Henkan (Direct Energy Conversion), Kougakusha, 1968.

$$W_o = AV_o T_E^2 \exp\{-e(V_o + \phi_E)\} \tag{1}$$

$$J_o = AT_E^2 \exp\{-e(V_o + \phi_E)/kT_E\} \tag{2}$$

Meanings of symbols used in the equations (1), (2) are follows.

$W_o$ (W/cm²): Maximum output density per unit area
$J_o$ (A/cm²): Current density of thermionic current when the maximum output density is obtained
$V_o$ (V): Voltage when the maximum output density is obtained
$T_E$ (K): Temperature of the emitter
$\phi_E$ (eV): Work function of the emitter
A (A/cm²K²): Richardson constant
e (C): Quantum of electricity
k (J/K): Boltzmann constant When the emitter 2 and the collector 3 in the example 1 are assumed, the work function $\phi_E$ of the emitter 2 is 1.7 eV and the work function of $\phi_C$ of the collector 3 is 1.7 eV. The temperature $T_E$ of the emitter 2 is assumed to be 873 K, and the temperature $T_C$ of the collector 3 is assumed to be 673 K. In addition, Richardson constant is set to 120 A/cm²K².

When $V_o$ is numerically calculated based on the above-described values and the equation (1), $V_o$ is about 0.075 V. Then, $J_o$ is calculated from the calculated $V_o$ using the equation (2). When the internal resistance of each of the emitter 2 and the collector 3 is expressed by R (Ωcm²), a loss L (W/cm²) caused by the internal resistance R can be expressed as $L = J_o^2 R$ using the calculated $J_o$. By subtracting the loss L from the maximum output density $W_o$, an effective output density W (W/cm²) when the internal resistance is R can be calculated.

Figure 6:
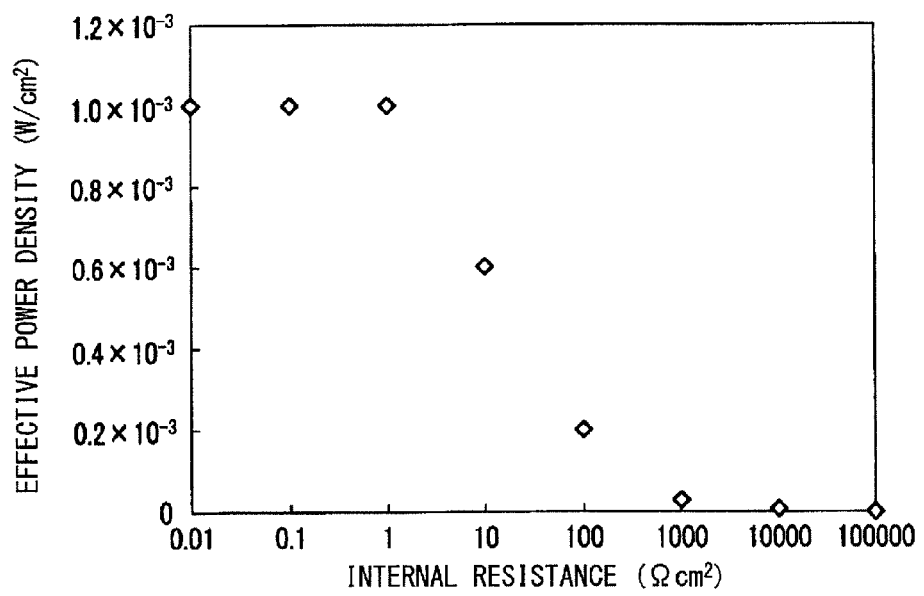
FIG. 6 is a graph showing a relationship between an internal resistance in a thickness direction between an emitter substrate and an emitter surface and an estimated output density in the example 2.

FIG. 6 is a graph showing a relationship between an internal resistance R and an effective output density W. A horizontal axis in FIG. 6 indicates a value of the internal resistance R on logarithmic scale. A vertical axis indicates a value of the effective output density W. As shown in FIG. 6, when the internal resistance R is equal to or less than 1 Ωcm², the effective output density W is constant regardless of the internal resistance R. Thus, when the internal resistance R is equal to or less than 1 Ωcm², the loss L is negligibly small with respect to the maximum output density $W_o$.

On the other hand, when the internal resistance R is greater than 1 Ωcm², the effective output density W decreases with increase of the internal resistance R. Thus, the effective output density W decreases by the influence of the loss L.

From the above-described analysis, it can be assumed that the loss caused by the internal resistance can be sufficiently reduced when the internal resistance of each of the emitter 2 and the collector 3 is equal to or less than 1 Ωcm². The above-described analysis is performed on the assumption that temperature $T_E$ of the emitter 2 is 873 K, and the temperature $T_C$ of the collector 3 is 673 K. However, it can be considered that a similar tendency is indicated even when the temperature $T_E$ of the emitter 2 and the temperature $T_C$ of the collector 3 change.

In the example 1 and the example 2, the low resistance layer 22 is stacked directly on the emitter substrate 21. In another example, an interface intermediate layer may be disposed between the emitter substrate 21 and the low resistance layer 22. For example, when the interface intermediate layer made of titanium carbide is formed, the following method can be employed.

Firstly, a titanium thin layer is formed on the emitter substrate 21 by deposition. Then, the low resistance layer 22 and the electron emission layer 23 are formed, for example, by a microwave plasma CVD method. Accordingly, the titanium thin layer and carbon included in the low resistance layer 22 react to form the interface intermediate layer made of titanium carbide.

When the interface intermediate layer made of titanium carbide is formed, the internal resistance in the thickness direction between the emitter substrate 21 and the emitter surface 24 can be further reduced compared with a case where the interface intermediate layer is not formed. Thus, thermionic current can be further increased and the power generation efficiency can be improved.

What is claimed is:

1. A thermionic power generator comprising:
    an emitter including an emitter substrate having an electric conductivity, a low resistance layer stacked to the emitter substrate and made of an n-type diamond semiconductor that includes phosphorus as a donor, and an electron emission layer stacked to the low resistance layer and made of an n-type diamond semiconductor that includes nitrogen as a donor, the emitter generating thermions; and
    a collector including a collector substrate having an electric conductivity, the collector disposed opposite to the emitter via a clearance and collecting the thermions, wherein
    the electron emission layer has a thickness equal to or less than 40 nm,
    the emitter further includes an interface intermediate layer disposed between the emitter substrate and the low resistance layer, and
    the interface intermediate layer is configured so that a sum of a resistance in a thickness direction of the interface intermediate layer, an interface resistance with the emitter substrate, and an interface resistance with the low resistance layer is smaller than an interface resistance between the emitter substrate and the low resistance layer.

2. The thermionic power generator according to claim 1, wherein
    the emitter has an emitter surface disposed opposite to the collector, and
    the emitter surface is terminated with hydrogen.

3. The thermionic power generator according to claim 1, wherein
    the emitter has an emitter surface disposed opposite to the collector,
    the collector has a collector surface disposed opposite to the emitter,
    the emitter has an internal resistance equal to or less than 1 $\Omega cm^2$ in a thickness direction between the emitter substrate and the emitter surface, and
    the collector has an internal resistance equal to or less than 1 $\Omega cm^2$ in a thickness direction between the collector substrate and the collector surface.

4. The thermionic power generator according to claim 1, wherein
    the emitter substrate includes one of Si, Ti, Mo, Ir, Ta, W, Ru, Cr, and Pt.

5. The thermionic power generator according to claim 1, wherein the interface intermediate layer includes metal carbide.

* * * * *